United States Patent [19]

Schubach

[11] 3,981,107

[45] Sept. 21, 1976

[54] ROOF-TO-SIDEWALL JOINT STRUCTURE FOR TRANSIT VEHICLE

[75] Inventor: Theodor C. Schubach, Bonita, Calif.

[73] Assignee: Rohr Industries, Inc., Chula Vista, Calif.

[22] Filed: Apr. 28, 1975

[21] Appl. No.: 572,124

[52] U.S. Cl. .......................... 52/11; 52/56; 52/90; 52/588; 296/28 A; 296/137 R
[51] Int. Cl.² .......................... B62D 31/02
[58] Field of Search ................ 52/48–56, 52/11, 588, 262, 90, 45–47; 296/28 M, 28 R, 137; 105/401, 409

[56] References Cited
UNITED STATES PATENTS

| | | | |
|---|---|---|---|
| 2,029,756 | 2/1936 | Davis | 296/28 M |
| 2,595,212 | 4/1952 | Ledwinka | 105/397 X |
| 3,252,730 | 5/1966 | Chieger | 296/28 M |
| 3,461,819 | 8/1969 | Eggert | 105/401 |
| 3,713,679 | 1/1973 | Beschmann | 52/51 |
| 3,815,307 | 6/1974 | Tantlinger | 296/137 R |
| 3,827,137 | 8/1974 | Schubach | 296/28 R |

*Primary Examiner*—John E. Murtagh
*Attorney, Agent, or Firm*—Patrick J. Schlesinger

[57] ABSTRACT

The roof structure of a ground transportation vehicle is manufactured as a unit, complete with all components, accessories, finish and trim, as are also each of the vehicle sidewalls, including the seats, which preferably are cantilever or semi-cantilever type. The completed roof structure and walls are then assembled and secured, by externally applied fastenings, in permanently interconnected relation on a base structure which has a finished floor covering laid thereon, so that the interior of the vehicle is then complete, or virtually complete.

6 Claims, 2 Drawing Figures

ROOF-TO-SIDEWALL JOINT STRUCTURE FOR TRANSIT VEHICLE

BACKGROUND OF THE INVENTION

In the past, in making a transportation type vehicle such as a bus, or a car for a mass transportation system, it has been customary to erect on a partly completed chassis or base structure the frame structure or shell for the sidewalls and roof of the vehicle, which is then completed by the installation of electrical wiring, air conditioning equipment, heating and cooling ducts, fixtures, trim, seats, floor covering, etc. Such "stick type" construction is slow and costly, with artisans of various trades working interiorly of the car from the time the sidewall and roof frames or shells are erected on the base structure until the final interior decoration is completed and the floor covering laid. Such work is difficult to plan, schedule, supervise, and perform, and there is a constant possibility that one or another crew of workers may damage or soil work already performed, thereby causing duplication and delay and adding to cost.

PURPOSE OF THE INVENTION

A primary objective of the present invention is to provide an improved structure and method for manufacturing a transportation type vehicle, wherein finished roof structure and sidewalls, with all assemblies, components and accessories installed therein and interior finish applied, are such manufactured to finished form in individual jigs, which are positioned for maximum worker accessibility and efficiency. The completely finished roof structure and sidewalls are then removed from their respective jigs, and are interlocked and permanently secured in substantially unitary relation on a usual car base structure, whereupon the interior of the vehicle is completed, or substantially so.

BRIEF DESCRIPTION OF THE DRAWINGS

The foregoing objectives of the invention will be apparent from the following description and the accompanying drawings, wherein.

DETAILED DESCRIPTION OF THE DRAWINGS

Figure 1:
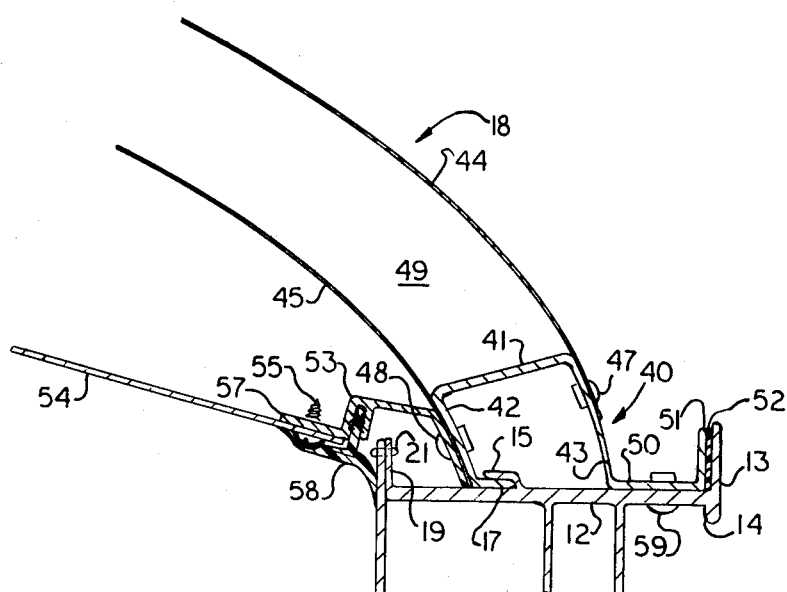
FIG. 1 is a fragmentary, vertical, transverse, sectional view of the roof-to-sidewall joint area of a vehicle made in accordance with the present invention.

Referring to the drawing in detail, the upper portion of the sidewall 10 of a transportation type vehicle A, such as a bus, or a car for a mass transit railway system, comprises an extrusion 11, which, like other extrusions illustrated, may be of aluminum. The extrusion 11 has a horizontal top plate portion 12 with an integral, upturned flange 13 on its laterally outer end, and a drip bead 14 therebeneath. A locking flange 15, for interlocking engagement with a flange 17 of a roof structure 18, is also integral with the extrusion top plate portion 12, as is also an upturned flange 19 provided along the inner edge of such top plate portion 12.

A wall lining plate 20 has its upper edge attached, as by rivets 21, to the inner extrusion flange 19, and the lower portion of this lining plate 20 is bent angularly outwardly at 22, and its lower edge secured as by self tapping screws 23 to an extrusion 24, which in turn is secured by rivets 25 to an angle flange 26 integral with the lower portion of the first mentioned extrusion 11.

A window frame 27 of suitable type may be of molded rubber or plastic, with exterior grooves 28 and 29 therein which receive the lower edges of the extrusions 11 and 24, respectively. The window frame 27 has also an inner groove 30, into which is fitted a channel member 31 of suitable material, and double window panes 32 and 33 are in turn fitted into grooves provided in a marginal seal 34, which is fitted into the channel member 31 in a manner which will be apparent to those familiar with current practice in this field.

The vehicle roof structure 18 comprises an extrusion 40 along each side thereof with an inverted channel portion 41, the sidewalls 42 and 43 of which conform, respectively, to the curvature of an outer roof sheet 44, and a roof liner sheet 35 spaced inwardly therefrom. The roof sheet 44 and liner 45 are secured to the sides of the channel portion 41 by rows of rivets 47 and 48, respectively. The space 49 between the roof sheet 44 and liner 45 is filled with suitable structural insulative material, not shown, such as, for example, plastic foam.

The vehicle sidewalls, and the roof structure 18, have all specified accessories, equipment, ducts, fixtures, trim, etc. installed therein and finish applied thereto during manufacture in their respective jigs, not shown, which may be of any suitable or conventional type, so that they are completely finished prior to assembly with each other and with a suitable, conventional base structure to be referred to later herein.

The interlocking roof flange 17, mentioned previously herein, extends outwardly from the lower edge of the channel inner wall 42, which it is integral, and a second integral flange 50 also extends horizontally outwardly from the lower edge of the outer channel wall 43 and is supported in conforming relation on the top plate portion 12 of the first mentioned extrusion 11. An integral upturned flange 51 at the outer edge of the horizontal roof flange 50 is of substantially the same height as the upright flange 13 on the outer edge of the extrusion top plate portion 12, and is sealed thereto by a suitable sealant 52.

A ceiling support extrusion 53 is secured by the previously mentioned rivets 48 to the inner wall 42 of the extrusion channel portion 41, with the roof liner sheet 45 interposed therebetween, and a ceiling lining sheet 54 is attached by sheet metal screws 55 to an integral flange 57 provided on the inner edge of the roof extrusion 53. An inverted T shape seal 58 of suitable resilient material, such as rubber or plastic, has the portion thereof representing the stem portion of the T thereof fitted securely into a channel provided therefor in the ceiling support extrusion 53. The outer portion of the head of the T shape seal 58 is curved downwardly and seats resiliently against the wall lining plate 20 when the parts are in their assembled, solid line position of FIG. 1.

Figure 2:
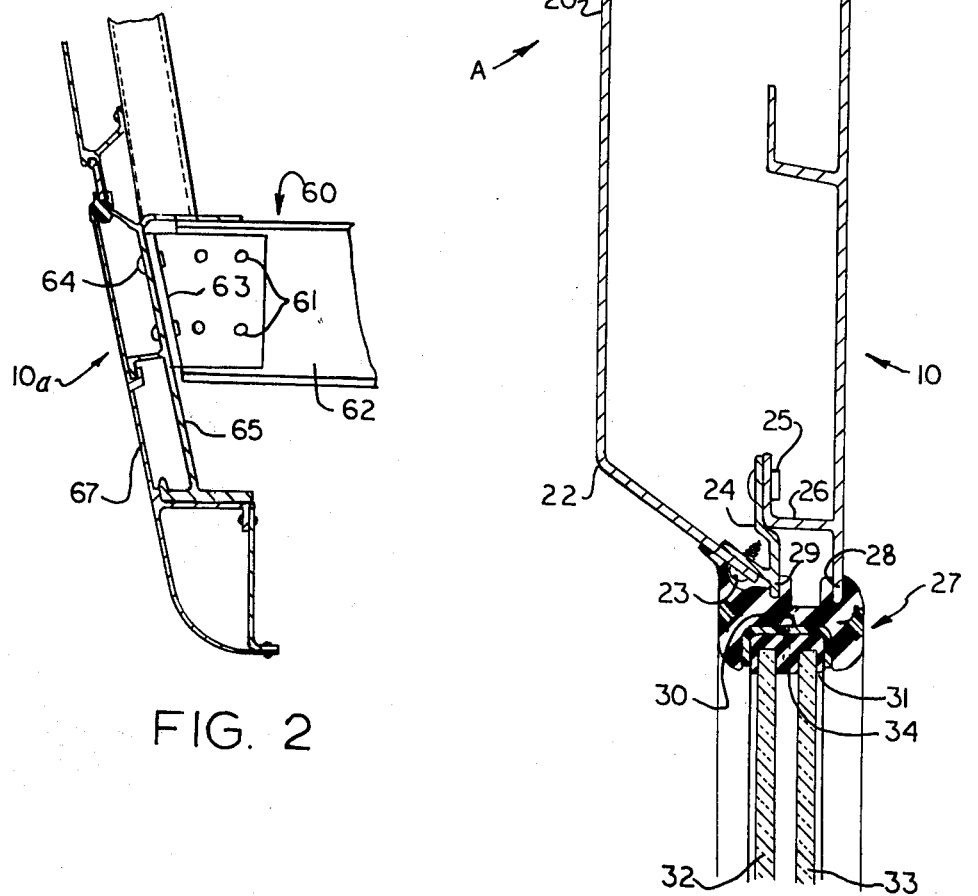
FIG. 2 is a similar view, but in reduced scale, of the wall-to-base structure joint area on the opposite side of such vehicle.

The bottom of each completed wall structure 10 also is preferably secured to a usual vehicle base structure 60 by a joint structure completed by workers working exteriorly of the vehicle. The illustrative bottom joint structure, see FIG. 2, comprises a pair of angle plates 63 attached, as by rivets 61, to each end of each of the usual floor beams 62 of the vehicle base structure. Rivets 64 secure the angle plates 61 to an extrusion 65 comprising the lower portion of each sidewall as shown in FIG. 2. A cover plate 67, flush with the outer surfaces of the lower sidewall 10a is mounted over the riveted sidewall to base structure joint thus formed to cover and conceal the joint and to provide a substantially continuous exterior surface for this portion of the vehicle body.

OPERATION

Although the sequence of assembly of the roof structure, sidewalls and base structure is not necessarily fixed, it is preferred at present to first assemble the roof structure 18 and sidewalls 10 and 10a in their completed, finished form. In thus assembling the individually completed roof structure and sidewalls, the latter are erected and the roof structure 18 is lowered onto the walls and is interlocked thereto by moving the sidewalls relatively to the roof structure to bring each flange 17 to interlocked position beneath its respective flange 15. Rivet holes are punched in the superposed flanges 12 and 50, and rivets 59 are inserted in these holes and set by workers working exteriorly of the vehicle, thus permanently securing the walls and preventing relative displacement therebetween. The space between the upstanding flanges 13 and 51 is sealed with a suitable sealant 52.

The lower ends of the vehicle sidewalls, as shown by the wall 10a of FIG. 2, are then fitted to and secured by the rivets 64 to a vehicle base structure 60 as shown. The base structure employed preferably has a usual floor covering, now shown, applied thereto prior to assembly with the sidewalls so that it is unnecessary after such assembly to perform any further work inside the vehicle, or even to have any workmen enter the car.

The vehicle end portions, not shown, may be completed and attached to the assembled base structure, walls and roof structure in any suitable or well known manner. However, the end portions of such vehicles may be manufactured in widely different ways, and since such manufacture, and the assembly of such end portions with the remainder of the vehicle are not features of the present invention, they are not shown or described herein.

The invention provides a simple, fast, efficient, economical, solution to a problem which has existed up to the present time in the manufacture of vehicles of the type referred to, wherein installers of lighting fixtures, air conditioning equipment and seats, painters, and others work in cramped quarters with their paint, adhesives and other materials, and power tools with their hoses and extension cords strung here and there, all detrimental to workmanlike performance and potentially hazardous to work already completed.

Thus, by means of this invention, low cost labor areas are used with minimum freight penalty, and the facilities for, and operations connected with, final assembly are minimized.

Having thus described my invention, what I claim as new and useful and desire to protect by U.S. Letters Patent is:

1. In a transit vehicle having two sidewalls each having an upwardly exposed joint surface along its upper edge, and a roof structure terminating along each side thereof in a downwardly exposed marginal joint surface for seating in support relation on the upwardly exposed upper surface of its respective side wall, an externally completed joint structure connecting each side of the roof structure in supported relation to the upper joint surface of the sidewall on the same side of the vehicle, said joint structure comprising:

a side flange extending laterally outwardly along the outer edge of each side of the roof structure, at least a portion of the under surface of each of said roof structure side flanges comprising an extension of its respective downwardly exposed marginal roof surface, a first locking flange extending laterally in one direction along each side of the roof structure and spaced inwardly, by a distance approximately the width of its respective side wall joint surface, toward the longitudinal center line of the vehicle from its respective outwardly extending roof structure side flange, a side flange extending laterally outwardly from the upper portion of each of said sidewalls, a top surface of each of said latter flanges conforming to, and closely underlying, the under surface of the roof structure side flange on the same side of the vehicle, a second locking flange on each of said sidewalls and extending laterally, in the opposite direction from, and in interlocking relation with, the said first locking flange on the corresponding side of the roof structure, and means applied by a worker exteriorly of the vehicle securely interconnecting the superposed roof and sidewall side flanges along each side of the vehicle, thereby retaining the upper portion of each side wall against movement relative to the roof structure in a direction to withdraw each said first locking engagement with its respective said second locking flange.

2. A roof-to-sidewall joint structure for a transit vehicle as defined in claim 1 wherein an extruded metal structural element is embodied in the upper end of each sidewall, and the flange extending laterally from the upper portion of each sidewall and the said second locking flange on the corresponding side of the vehicle are integrally connected to their respective sidewall structural element.

3. A roof-to-sidewall joint structure for a transit vehicle as claimed in claim 1 wherein a flange extends upwardly along laterally outward edge of each roof structure side flange to form, with its respective roof structure side flange and a portion of the roof structure laterally inwardly of the latter flange, a gutter to carry runoff water from the roof of the vehicle.

4. A roof-to-sidewall joint structure for a transit vehicle as claimed in claim 3 wherein a flange also extends upwardly from the outer edge of the laterally extending flange of each sidewall structural members, and lies closely adjacent the upwardly extending flange of its respective roof structure side flange.

5. A roof-to-sidewall joint structure for a transit vehicle as claimed in claim 4 wherein sealing means is interposed between the two closely adjacent, upwardly extending flanges on each side of the vehicle, thereby to seal the space between such two adjacent flanges against the admission of water and moisture.

6. A roof-to-sidewall joint structure for a transit vehicle as claimed in claim 1 wherein the means retaining the upper end of each sidewall against movement which would withdraw from its respective second locking flange the first locking flange in interlocking engagement therewith comprises fastening means penetrating each outwardly extending flange on the roof structure and the underlying, laterally outwardly extending flange of the sidewall structural member on the same side of the vehicle.

* * * * *